April 14, 1936.    L. BERRY ET AL    2,037,109
QUICK DETACHABLE BRAKE LINING UNIT
Filed July 20, 1932
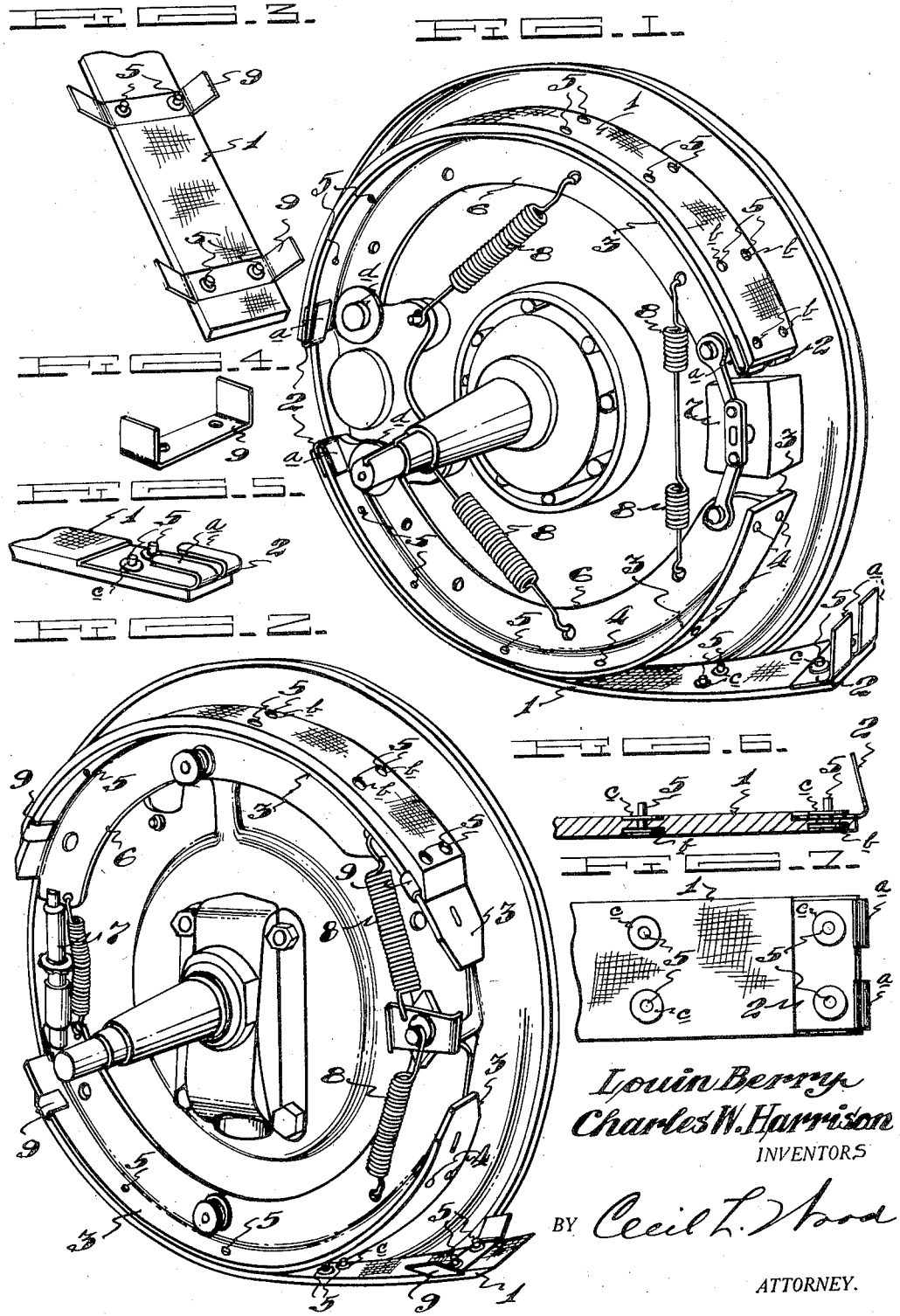

Patented Apr. 14, 1936

2,037,109

UNITED STATES PATENT OFFICE 2,037,109

QUICK DETACHABLE BRAKE LINING UNIT

Louin Berry and Charles W. Harrison, Fort Worth, Tex.

Application July 20, 1932, Serial No. 623,563

1 Claim. (Cl. 188—234)

This invention relates to braking equipment for motor vehicles and it has particular reference to a novel lining for expansible brakes and its principal object resides in the provision of a brake lining which can be quickly and easily installed on conventional brake shoes of all standard motor vehicles in which the exterior expansible type of brake shoes are utilized.

Another object of the invention is manifest in the provision of an interchangeable brake lining capable of installation without removing the shoes from the brake assembly and the necessity for the usual operations commonly attendant upon the removal of brake linings in conventional brake assemblies resulting in a saving of time and expense.

A still further object of the invention resides in the provision of units of brake lining material comprised of such necessary elements as will do away with the ordinarily required bradding of rivets in the brake shoes and provide a highly efficient braking service at a moderate cost and being so constructed as to prevent the brake drums from being scratched or scored when the linings have been worn down sufficiently to expose the heads of the rivets ordinarily used for securing the linings to the shoes.

Broadly, the invention seeks to comprehend the provision of a new and useful improvement in braking facilities, the purpose of which being that of effecting a means whereby worn and ineffectual brake bands will be changed more frequently and thereby afford greater protection to human lives and property through the ability of all motorists to provide their motor vehicles with adequate braking equipment at a small cost and a great saving of time.

While the foregoing objects are paramount, other and lesser objects will become manifest as the description proceeds taken in connection with the appended drawing wherein:

Figure 1 illustrates a brake assembly of a conventional motor vehicle showing the preferred form of the invention installed thereon.

Figure 2 is a perspective view of another brake assembly used in a conventional motor vehicle in which is shown installed a modified form of the invention.

Figure 3 is a perspective view of one form of the invention, illustrating the clips through the medium of which the invention is held in place upon the brake shoes.

Figure 4 is a perspective view of one of the clips shown in Figure 3.

Figure 5 is a perspective view of the preferred form of fastening means secured to one end of the improved brake band described herein.

Figure 6 is a longitudinal fragmentary view of the preferred form of the invention, the latter being shown in perspective illustrated on a brake assembly, as exemplified in Figure 1, and Figure 7 is a fragmentary plan view of the invention as shown in Figure 6.

The common method of installing brake lining material in brake assemblies of motor vehicles is that of removing the shoes from the assemblies and permanently securing the lining material to the said shoes by rivets which are inserted through apertures around the convex surface of the shoes and bradding them on the under side for security.

While the method described in the foregoing paragraph is recognized as the standard, it is unsatisfactory in that a dissembling of the brake assemblies must be accomplished before the brake lining material can be applied. These operations, because of the time which is required for the performance, are expensive and bothersome and for this reason motorists often continue to use unsatisfactory brakes which is a menace to pedestrians and other vehicles. The invention herein described is designed to satisfactorily replace such inefficient equipment.

Accordingly, the invention comprises a strip 1 of conventional brake lining material cut in the required lengths for brake shoes utilized in standard makes of motor cars and trucks, as shown in Figures 1 and 2, and provided, in its preferred form, with a bifurcated metal clip 2 having a pair of fingers $a$ on each end of the strip 1, as exemplified particularly in Figures 1 and 5.

The standard brake shoe 3 is provided with a series of apertures 4 arranged in pairs at given intervals around its axial or convex surface which are for the purpose of receiving rivets by which the conventional brake lining material is secured thereto. The invention herein described is therefore provided with a series of studs or pins 5 in the strip 1 of the lining material to correspond with the apertures 4 in the brake shoe 3. These studs or pins 5 are provided with heads $b$ countersunk into the brake lining material 1 and secured on opposite sides against displacement from the material 1 by small washers $c$ which are affixed to the studs 5 by bradding, brazing or soldering, or some other suitable means, as shown in Figure 6.

The fingers $a$ of the bifurcated member 2 on one end of the strip 1 of the brake lining material are turned back in the manner illustrated in Figure 5. When it is desired to attach the strip 1, therefore, to a brake shoe 3, the inwardly turned fingers a of the bifurcated member 2 are passed over one end of the brake shoe 3 and the studs 5 are inserted into the apertures 4 in sequence as the strip 3 of lining material is urged down against the convex surface of the brake shoe 3 until the opposite end of the strip 1 of brake lining material engages the surface of the shoe 3 whereupon the fingers a of the bifurcated member 2 are turned under, in like manner as that shown in Figures 1 and 5, and the strip 1 will be secured to the shoe 3 and ready for service.

Obviously, when all of the studs or pins 5 have been inserted through the apertures 4 and the fingers a of the bifurcated metal clip 2 have been bent around the ends of the shoe 3, the unit 1 of brake lining material is restrained against longitudinal or lateral displacement. It requires only slight restraint to be applied to the ends of the brake lining material 1 to restrain the latter in the arcuate formation which it assumes by reason of its conformation to the contour of the brake shoe 3. It is desirable, however, that the metal clips 2 be of such material as will bend easily yet having sufficient tension to afford a dependable securing means.

Having particular reference to Figure 1 it will be seen that the brake shoes 3 are of such construction as to provide a flat convex or axial surface, to which the strip of brake lining material is affixed, and having an inwardly or axially projecting flange 6, one end of which is pivoted at d, while the opposite ends of the upper and lower shoes 3, the latter being opposingly disposed relative to their arcuate conformation, are provided with suitable mechanism 7 to expand the shoes 3 within the drum (not shown) to effect an application of the brakes. Tension springs 8 are provided in the assemblies to contract the shoes 3 when the brakes are released, causing the shoes 3 to recede from the drum.

While the form of clip 2 is preferred and is considered the most desirable for use on the type of shoe 3, illustrated in Figure 1, by reason of the peculiar construction of the latter, the construction shown in Figures 3 and 4 can manifestly be utilized. By reference to Figure 3 it will be seen that a series of metal strips 9 are attached to the strip 1 of brake lining material by means of the pins or studs 5, the ends of each strip 9 sufficiently overreach the edges of the strip of material 1 to enable their being turned back over the edge of the brake shoes 3, in the manner shown in Figure 2. This form of clip or strip 9 is shown in detail in Figure 4. The use of the washer c can be dispensed with since the strip 9 will serve a dual purpose, i. e., that of holding the rivets or studs 5 in the brake lining material 1 and holding the latter securely on the brake shoes 3.

The brake shoes 3 in the assembly shown in Figure 2 are of such character as to preclude the use of the bifurcated form of clip 2 illustrated in use on the shoes 3 of the assembly shown in Figure 1. For this reason the clip or strip 9 is provided. Manifestly, this latter form of fastening means can be used satisfactorily in either form of brake assemblies illustrated in Figures 1 and 2.

Motor vehicles equipped with the ordinary type of brake lining material secured to the the shoes 3 by means of the conventional rivets can be removed from the brake shoes by inserting a screw driver, or similar tool, between the brake lining material 1 and brake shoe 3 adjacent to each pair of rivets and by proper manipulation, the latter can be withdrawn from the apertures 4 in the brake shoes 3.

When this is accomplished the invention herein described can be applied by slipping the end of the brake lining material 1, having the bifurcated member 2 whose fingers a are formed in the manner shown in Figure 5, over one end of the brake shoe 3 and inserting each pair of studs or pins 5 into the apertures 4 along the entire arcuate surface of the shoe 3 until the opposite end engages the surface whereupon the extended fingers a of the opposite member 2 are turned over the opposite end of the shoe 3 to secure the brake lining 1 to the latter.

In installing the form illustrated in Figures 2 and 3, when the extended ends of the strips 9 have been turned beneath the edges of the shoe 3 the studs or pins 5 are inserted into the apertures 4 along the arcuate axial surface of the shoe 3 until the opposite end of the material 1 engages the rounded surface of the shoe 1 at which point the ends of the opposing strip or clip 9 will turn under to secure the material 1 to the shoe 3. As previously stated, when this form of clip 9 is used, one may be applied at each set of studs or pins 5 along the entire length of the strip of brake lining material 1 if it is so desired.

The construction of the invention can be accomplished by cutting the brake lining material 1 into strips of the required lengths for standard brake shoes 3 and punching the material 1 to provide apertures corresponding with those provided in the brake shoe 3 and providing for the securement of the pins or studs 5 in such apertures in the material 1, as illustrated in Figures 6 and 7. The clips 2 and 9 can be made with suitable dies from bendable material having sufficient tension to insure against breakage or any undue strain which might displace the fingers a of the member 2 and the extended ends of the strip 9.

Manifestly, the construction shown is capable of some modification and such modification as is considered within the scope and meaning of the appended claim is also considered within the spirit and intent of the invention.

What is claimed is:

In combination with a brake shoe for motor vehicles having an exterior operating face and a series of orifices uniformly arranged upon the said face, a strip of brake lining material having metal tips fixed upon each end thereof capable of overreaching and engaging the underside of the said shoe at both of its ends, the said strip having a series of studs projecting therethrough and capable of entering the said orifices in the said brake shoe.

LOUIN BERRY.
CHARLES W. HARRISON.